Jan. 4, 1966 G. NATTA ETAL 3,227,700
PROCESS FOR POLYMERIZING ALPHA-OLEFINS IN THE
PRESENCE OF VIOLET TITANIUM TRICHLORIDE AND
DIALKYL ALUMINUM MONOIODIDE
Filed June 7, 1961
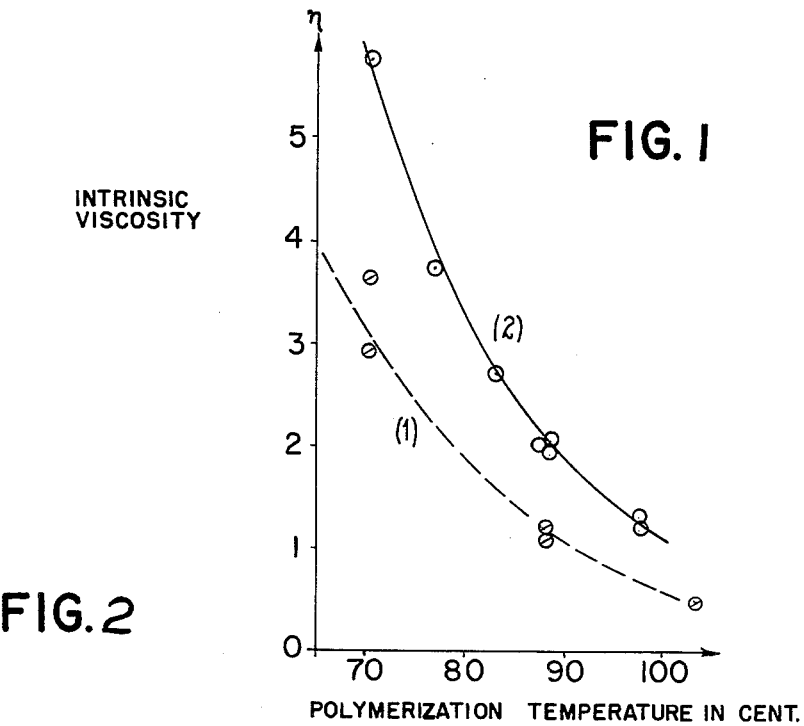
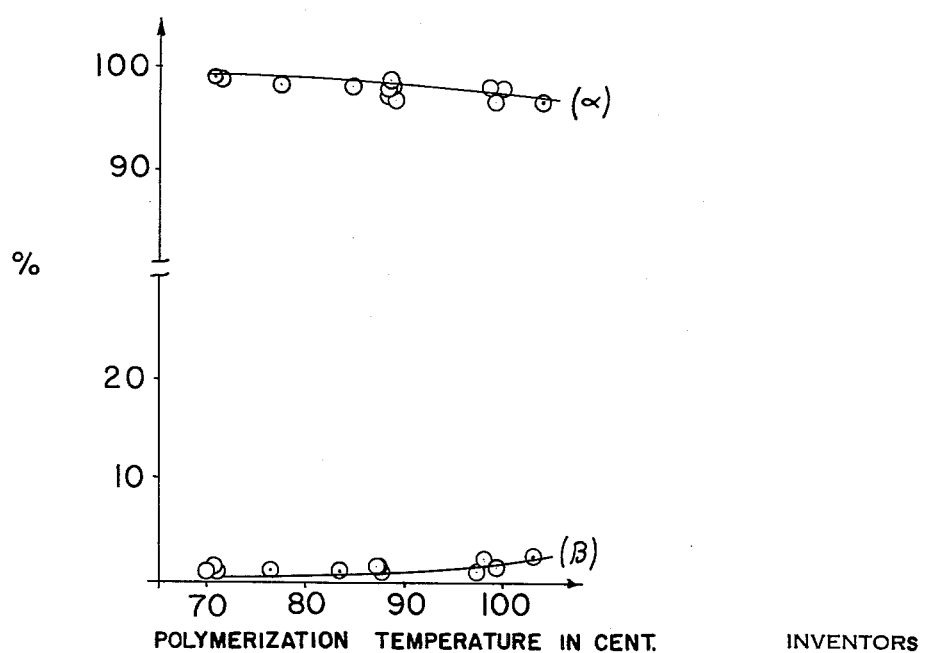
INVENTORS
GIULIO NATTA
ITALO PASQUON
ADOLFO ZAMBELLI
BY
Alexander J. McKillop
ATTORNEY 大
United States Patent Office 3,227,700
Patented Jan. 4, 1966

3,227,700
PROCESS FOR POLYMERIZING ALPHA-OLEFINS IN THE PRESENCE OF VIOLET TITANIUM TRICHLORIDE AND DIALKYL ALUMINUM MONOIODIDE
Giulio Natta, Italo Pasquon, and Adolfo Zambelli, Milan, Italy, assignors to Montecatini, Società Generale per l'Industria Mineraria e Chimica, a corporation of Italy
Filed June 7, 1961, Ser. No. 154,380
Claims priority, application Italy, June 10, 1960, 10,351/60
9 Claims. (Cl. 260—93.7)

This invention relates to a process of polymerizing alpha-olefins to high polymers showing the isotactic structure, having a high degree of crystallinity and a molecular weight which can be regulated, as desired, to very low values.

It is known that propylene and other alpha-olefins can be polymerized with the aid of stereospecific catalytic systems consisting essentially of violet titanium trichloride and organo-metallic compounds, such as alkyl aluminum compounds, dialkyl aluminum monohalides, alkyl lithium compounds and dialkyl beryllium compounds.

By using such catalytic systems, it is possible to regulate the molecular weight of the polymers by regulating the polymerization temperature, more specifically by increasing the polymerization temperature, the average molecular weight of the polymer is reduced.

The decrease of the molecular weight obtained by increasing the polymerization temperature is, however, accompanied by a considerable decrease in the stereospecificity of the catalyst, i.e., in general by operating at temperatures higher than about 80° C., polymer products containing a high proportion of an amorphous fraction extractable with boiling ethyl ether are obtained. Moreover, such catalysts at high temperature quickly lose their activity. For these reasons, when using these known catalysts, it is not convenient in practice to regulate the molecular weight by varying the polymerization temperature.

On the other hand, it is important to regulate the average molecular weight of poly(alpha)-olefins and other polyolefins, since polymers having different molecular weights are required for such different uses as molded articles and fibers.

The regulation of the average molecular weight of polypropylene and of the other polyolefins by carrying out the polymerization in the presence of hydrogen or alkyl zinc compounds has been proposed.

The present invention provides a process for preparing high molecular weight polymerizates of alpha-olefins, such as propylene, butene-1, 4-methyl-pentene-1, hexene-1, heptene-1, styrene and the like, which polymerizates contain isotactic macromolecules, the process comprising treating an alpha-olefin with a violet titanium trichloride-organo-aluminum monoiodide catalyst system at a temperature of from 70° C. to 110° C.

In this process of the present invention there is only a limited decrease in the activity of the catalyst and only small amounts of an amorphous polymer fraction soluble in boiling ethyl ether are produced. The molecular weight of the polymer obtained decreases quickly as the temperature of treatment is increased.

An object of the present invention is, therefore, to provide a process for polymerizing alpha-olefins to high molecular weight, crystalline, stereo-regular polymers using a polymerization catalyst which produces highly crystalline polymers.

A further object of the present invention is to provide a polymerization process wherein the molecular weight of the polymers may be easily regulated without the use of extraneous molecular weight regulators.

Other objects and advantages springing from the present invention will become apparent from the following description and working examples.

The process of the present invention, in contrast to the earlier processes, offers a means for regulating the average molecular weight of the polymer without the need of having to use other compounds as regulators of the average molecular weight of the polymer.

By simply varying the polymerization temperature (without any substantial decrease in the catalyst's activity due to the increase of temperature), there is obtained a highly crystalline crude polymerizate which has an ether-soluble fraction of less than 3%.

Furthermore, it has surprisingly been observed that in the crude polymerizates having an intrinsic viscosity (determined in tetrahydronaphthalene at 135° C.) lower than about 2.5 (corresponding to a molecular weight of approximately 400,000), which are obtained with the aid of applicants' catalytic systems, the fraction of the polymerizate which is extractable with boiling ethyl ether appears to be partially crystallizable under X-ray examination owing to the presence of macromolecules having an isotactic structure. This surprising result is ascribed to the presence in the crude polymerizate of stereoblock macromolecules having a partially ordered structure and a sufficiently low molecular weight ($[\eta]<0.26$, molecular weight $<20,000$) so that these macromolecules are extractable with the boiling ethyl ether.

In the case of propylene, by operating with the catalysts of the present invention in the presence of hydrocarbon solvents at suitable temperatures and pressures, a crude polypropylene polymerizate having an intrinsc viscosity (determined in tetrahydronaphthalene at 135° C.) from 3 to 0.5, a residue after extraction with boiling ethyl ether of more than 97% and a melting point of from 173° C. to 175° C. is obtained.

Suitable operating conditions are a temperature between 70° and 110° C. with a pressure from 1 to 20 absolute atmospheres.

At a temperature of about 70° C., a pressure of 1 to 5 absolute atmospheres is preferably used, while at temperatures of 90° C. and 110° C., pressures in the range of 1.5 to 15 absolute atmospheres and 5–20 absolute atmospheres, respectively, are preferred.

The accompanying drawing shows the curve of the polymerization of propylene with a catalytic system comprising 0.5 g. of $TiCl_3$, 1 cc. of $Al(C_2H_5)_2I$ and 250 cc. of toluene. The time of the run is four hours.

In FIGURE 1 of the drawing the polymerization temperatures are reported on the abscissa and the intrinsic viscosities, expressed as 100 cm.$^3$/g., on the ordinate. Curve 1 of FIGURE 1 shows a polymerization at a pressure of 10 atmospheres, and curve 2 a polymerization at a pressure of 3 atmospheres.

In FIGURE 2 of the drawing, the polymerization temperatures are reported on the abscissa, and the percentages of product and residue after an extraction with boiling ethyl ether are reported on the ordinate. Curve $\alpha$ represents the variation of the proportion of polymer residue after extraction with ethyl ether and curve $\beta$ shows the variation of the proportions of polymer extracted with ethyl ether.

A propylene polymerizate having the afore-mentioned characteristics, but possessing an intrinsic viscosity within closer limits, that is, between 1 and 1.5, can be obtained by carrying out the polymerization of propylene in aromatic solvents, such as benzene, toluene, chlorobenzene or xylene, at a pressure of from 1 to 3 absolute atmospheres when operating at 80° C. and at a pressure of 5 to 20 absolute atmospheres when operating at 100° C.

By operating with aliphatic solvents, such as hexane, n-heptane, octane and the like, instead of aromatic solvents, results similar to those mentioned above are obtained. When using such aliphatic solvents, all other conditions being the same, crude propylene polymerizates having a slightly higher molecular weight are obtained; in these polymerizates, however, the proportion of polymer which is insoluble in boiling ethyl ether still remains very high.

In the case of polybutene-1 crystalline polymerizates, a fraction soluble in boiling ethyl ether of less than 2% is obtained. This result was not possible with the known catalysts.

It can, therefore, be seen that by the process of the invention, crude polymers having a high steric regularity and a relatively low molecular weight, which are suitable for preparing fibers and the like, are obtained.

In comparison with the known polymerization processes, including those carried out in the presence of molecular weight regulators, such as hydrogen and alkyl zinc compounds, the process of the present invention offers the advantage of yielding a polymerizate which contains less than 3% of fraction soluble in boiling ethyl ether.

The Al/Ti molar ratio in the catalyst according to the present invention can be varied between 0.3 and 50.

The following examples are given to illustrate the present invention and are not limitative thereof:

*Example I*

0.5 g. of violet $TiCl_3$ (gamma-modification, see G. Natta, P. Corradini and G. Allegra, Rend. Acc. Naz. Lincei [8], 26, 155, 1959, obtained by the reduction of $TiCl_4$ at 200° C. with trialkyl aluminum), 1 cc. of diethyl aluminum monoiodide and 250 cc. of anhydrous toluene are introduced into a 0.5-liter autoclave kept at a constant temperature of 87° C. Propylene is then introduced up to a pressure of 10 atmospheres. After 90 minutes, 30 g. of a polymer which contains isotactic macromolecules is insoluble to an extent of 98.5% in boiling ethyl ether and has an intrinsic viscosity of 2.7 (determined at 135° C. in tetrahydronaphthalene) are obtained.

*Example II*

0.5 g. of violet $TiCl_3$ (gamma-modification), 1 cc. of diethyl aluminum monoiodide and 250 cc. of n-heptane are introduced by syphoning under vacuum into a 0.5-liter autoclave kept at a constant temperature of 87° C. Propylene is then introduced up to a pressure of 5 atmospheres. After 130 minutes, 10 g. of a polymer which contains isotactic macromolecules is insoluble to an extent of 97% in boiling ethyl ether and has an intrinsic viscosity (determined in tetrahydronaphthalene at 135° C.) of 2.75, are obtained.

*Example III*

0.5 g. of violet $TiCl_3$ (gamma-modification), 1 cc. of diethyl aluminum monoiodide and 250 cc. of toluene are introduced by syphoning under vacuum into a 0.5-liter autoclave kept at a constant temperature of 103° C. Propylene is then introduced up to a pressure of 12 atmospheres. After 80 minutes, 31 g. of a polymer which contains isotactic macromolecules is insoluble to the extent of 97% in boiling ethyl ether and has an intrinsic viscosity (determined in tetrahydronaphthalene at 135° C.) of 1.26, are obtained.

The fraction extracted with boiling ethyl ether from the crude polymer appears, by X-ray and infra-red examinations, to be partially crystallizable owing to the presence therein of some polypropylene macromolecules having an isotactic structure in part.

*Example IV*

0.5 g. of violet $TiCl_3$ (gamma-modification), 3 cc. of diethyl aluminum monoiodide and 250 cc. of toluene are introduced by syphoning under vacuum into a 0.5-liter autoclave kept at a constant temperature of 87° C. Propylene is then introduced up to a pressure of 2 absolute atmospheres. After 130 minutes, 13 g. of a polymer which contains isotactic macromolecules is insoluble to an extent of more than 98% in boiling ethyl ether and has an intrinsic viscosity (determined at 135° C. in tetrahydronaphthalene) of 1, are obtained. The fraction extracted from the crude polymer with boiling ethyl ether appears to be partially crystallizable owing to the presence of some polypropylene macromolecules having an isotactic structure in part.

*Example V*

0.9 g. of $TiCl_3$ (gamma-modification), 1 cc. of diethyl aluminum monoiodide and 200 cc. of n-heptane are introduced by syphoning under vacuum into a 0.5-liter autoclave kept at a constant temperature of 70° C.

90 g. of butene-1 are then introduced into the autoclave. After 20 hours, 70 g. of a polymer containing isotactic macromolecules and having an intrinsic viscosity of 2.88, are obtained. The crude polymer contains less than 2% of a fraction soluble in boiling ethyl ether.

*Example VI*

1.3 g. of $TiCl_3$ (gamma-modification), 2 cc. of $Al(C_2H_5)_2I$ and 250 cc. of toluene are introduced by syphoning under vacuum into a 0.5-liter autoclave kept at a constant temperature of 97° C. Propylene is then introduced up to a pressure of 1.4 absolute atmospheres. After 1 hour, 11.5 g. of a polymer which contains isotactic macromolecules is insoluble to an extent of 97.4% in boiling ethyl ether and has an intrinsic viscosity (determined in tetrahydronaphthalene at 135° C.) of 0.5, are obtained. The fraction extracted from the crude polymer with boiling ethyl ether appears to be partially crystallizable owing to the presence of some polypropylene macromolecules having an isotactic structure in part.

*Example VII*

0.5 g. of violet $TiCl_3$ containing $AlCl_3$ in solid solution (obtained by reducing $TiCl_4$ with metallic aluminum and then by finely grinding it), 1 cc. of $Al(C_2H_5)_2I$ and 250 cc. of toluene are introduced by syphoning under vacuum into a 0.5-liter autoclave kept at a constant temperature of 87° C. Propylene is then introduced up to a pressure of 2 absolute atmospheres.

After 85 minutes, 14 g. of a polymer, which is insoluble to an extent of 97% in boiling ethyl ether and has an intrinsic viscosity (determined in tetrahydronaphthalene at 135° C.) of 0.99, are obtained. The fraction extracted from the crude polymer with boiling ethyl ether appears to be partially crystallizable owing to the presence of some polypropylene macromolecules having an isotactic structure in part.

*Example VIII*

0.46 g. of violet $TiCl_3$ containing $AlCl_3$ in solid solution (obtained by reducing $TiCl_4$ with metallic aluminum and then finely grinding it), 1 cc. of $Al(C_2H_5)_2I$ and 250 cc. of toluene are introduced into a 0.5-liter autoclave kept at a constant temperature of 72° C. Propylene is then introduced up to a pressure of 2 absolute atmospheres. After 3 hours, 18.5 g. of a polymer which contains isotactic macromolecules, is insoluble to an extent of 99% in boiling ethyl ether and has an intrinsic viscosity (determined in tetrahydronaphthalene at 135° C.) of 3.6, are obtained.

*Example IX*

0.75 g. of violet $TiCl_3$ (alpha-modification, obtained by reducing $TiCl_4$ with $H_2$ at high temperatures), 2 cc. of $Al(C_2H_5)_2I$ and 250 cc. of toluene are introduced by syphoning under vacuum into a 0.5-liter autoclave, kept at a constant temperature of 70° C. Propylene is then introduced up to an absolute pressure of 1.4 atmospheres.

After 15 hours, 7 g. of a polymer insoluble to the extent of 99% in boiling ethyl ether, containing isotactic macromolecules and having an intrinsic viscosity (determined in tetrahydronaphthalene at 135° C.) of 2.37 are obtained. The fraction extracted from the crude polymer with boiling ethyl ether appears to be partially crystallizable owing to the presence of some polypropylene macromolecules having an isotactic structure in part.

*Example X*

1.7 g. of violet $TiCl_3$ (alpha-modification obtained by reducing $TiCl_4$ with $H_2$ at high temperatures), 2 cc. of $Al(C_2H_5)_2I$ and 250 cc. of toluene are introduced by syphoning under vacuum into a 0.5-liter autoclave kept at a constant temperature of 97° C. Propylene is then introduced up to an absolute pressure of 6 atmospheres.

After 15 hours, 16 g. of a polymer, insoluble to the extent of 97% in boiling ethyl ether, which has an intrinsic viscosity (determined at 135° C. in tetrahydronaphthalene) of 0.64, are obtained. The fraction extracted from the crude polymer with boiling ethyl ether appears to be partially crystallizable owing to the presence of some polypropylene macromolecules having an isotactic structure in part.

Many modifications and variations can, of course, be practiced without departing from the spirit of the present invention.

It is to be understood that it is not intended to limit the invention except as defined in the appended claims.

What is claimed is:

1. A process of regulating the average molecular-weight of the higher molecular weight polymers to obtain relatively lower molecular weight crystalline polymers of an alpha-olefin having isotactic macromolecules which comprises polymerizing said alpha-olefin having at least 3 carbon atoms in the molecule at a temperature ranging from about 70° C.–110° C. in the presence of a violet titanium trichloride-dialkyl aluminum monoiodide catalytic system wherein the aluminum to titanium molar ratio ranges from about 0.3 to 50.

2. The process of claim 1 further characterized in that the alpha-olefin is propylene.

3. The process of claim 1 further characterized in that the alpha-olefin is butene-1.

4. The process of claim 2 further characterized in that the polymerization of the alpha-olefin takes place in the presence of an inert hydrocarbon solvent.

5. The process of claim 1 further characterized in that the polymerization of the alpha-olefin takes place at a pressure ranging from about 1 to 20 absolute atmospheres.

6. The process of claim 2 further characterized in that the polymerization of the alpha-olefin takes place in the presence of an inert aromatic hydrocarbon solvent at a pressure ranging from about 1 to 3 absolute atmospheres and at a temperature ranging from about 70°–80° C.

7. The process of claim 1 further characterized in that the dialkyl aluminum monoiodide is a diethyl aluminum monoiodide.

8. The process of claim 7 further characterized in that the alpha-olefin is propylene.

9. The process of claim 7 further characterized in that alpha-olefin is butene-1.

References Cited by the Examiner
UNITED STATES PATENTS

| | | | |
|---|---|---|---|
| 2,909,511 | 10/1959 | Thomas | 260—93.7 |
| 2,915,514 | 12/1959 | Denkowski | 260—94.9 |
| 2,971,950 | 2/1961 | Natta et al. | 260—93.7 |

JOSEPH L. SCHOFER, *Primary Examiner.*

M. LIEBMAN, W. H. SHORT, *Examiners.*